United States Patent
Valgenti et al.

(10) Patent No.: US 10,944,768 B2
(45) Date of Patent: Mar. 9, 2021

(54) SYSTEM FOR AUTOMATED SIGNATURE GENERATION AND REFINEMENT

(71) Applicant: PETABI, INC., Irvine, CA (US)

(72) Inventors: Victor C. Valgenti, Bellingham, WA (US); Ya-Wen Lin, Sunnyvale, CA (US); Atsuhiro Suzuki, Mission Viejo, CA (US); Min Sik Kim, Irvine, CA (US)

(73) Assignee: PETABI, INC., Irvine, CA (US)

( * ) Notice: Subject to any disclaimer, the term of this patent is extended or adjusted under 35 U.S.C. 154(b) by 324 days.

(21) Appl. No.: 16/133,393

(22) Filed: Sep. 17, 2018

(65) Prior Publication Data

US 2019/0089723 A1 Mar. 21, 2019

Related U.S. Application Data

(60) Provisional application No. 62/559,277, filed on Sep. 15, 2017.

(51) Int. Cl.
| | |
|---|---|
| *H04L 29/06* | (2006.01) |
| *H04L 12/26* | (2006.01) |
| *H04L 12/24* | (2006.01) |
| *G06F 16/2457* | (2019.01) |
| *G06F 16/903* | (2019.01) |
| *G06F 21/64* | (2013.01) |
| *G06F 21/55* | (2013.01) |

(52) U.S. Cl.
CPC .... *H04L 63/1416* (2013.01); *G06F 16/24578* (2019.01); *G06F 16/90344* (2019.01); *G06F 21/554* (2013.01); *G06F 21/64* (2013.01); *H04L 41/145* (2013.01); *H04L 43/50* (2013.01); *H04L 63/1425* (2013.01); *H04L 63/1441* (2013.01)

(58) Field of Classification Search
CPC ............. H04L 63/1416; H04L 63/1425; H04L 63/1441; H04L 43/50; H04L 41/145; G06F 21/64; G06F 21/554; G06F 16/24578; G06F 16/90344
See application file for complete search history.

(56) References Cited

U.S. PATENT DOCUMENTS

| | | | | |
|---|---|---|---|---|
| 5,485,575 | A * | 1/1996 | Chess | G06F 21/564 713/188 |
| 6,108,799 | A * | 8/2000 | Boulay | G06F 21/564 714/38.13 |
| 7,367,056 | B1 * | 4/2008 | Szor | G06F 21/562 726/22 |

(Continued)

*Primary Examiner* — Michael R Vaughan
(74) *Attorney, Agent, or Firm* — Nixon Peabody LLP

(57) ABSTRACT

Systems and methods are provided for generating samples of network traffic and characterizing the samples to easily identify exploits. A first embodiment of the present disclosure can generate traffic between a sample generator and the target computing device based on a particular exploit. The traffic can be a plurality of samples of the exploit using an exploit script. The method can provide for collecting and storing the plurality of samples. These samples can then be used to characterize the exploit by identifying invariant portions and variable portions of the samples. The method can further provide for removing any artifacts from the samples. Regular expressions can be constructed based on the samples. Each regular expression can be tested and ranked according to metrics of efficiency and accuracy.

17 Claims, 10 Drawing Sheets

(56) References Cited

U.S. PATENT DOCUMENTS

| | | | | |
|---|---|---|---|---|
| 8,544,087 B1* | 9/2013 | Eskin | ................... | H04L 41/06 |
| | | | | 726/22 |
| 9,319,425 B2* | 4/2016 | Giokas | ................ | H04L 63/1416 |
| 2003/0212906 A1* | 11/2003 | Arnold | ................. | G06F 21/566 |
| | | | | 726/24 |
| 2006/0253906 A1* | 11/2006 | Rubin | .................... | H04L 63/20 |
| | | | | 726/23 |
| 2009/0144827 A1* | 6/2009 | Peinado | ............. | H04L 63/1433 |
| | | | | 726/25 |
| 2015/0143452 A1* | 5/2015 | Hamlen | ................. | G06F 21/54 |
| | | | | 726/1 |
| 2019/0364062 A1* | 11/2019 | Xu | ........................ | G06N 20/00 |

\* cited by examiner

SYSTEM FOR AUTOMATED SIGNATURE GENERATION AND REFINEMENT

CROSS-REFERENCE TO RELATED APPLICATIONS

This application claims priority to U.S. Provisional Application No.: 62/559,277, filed Sep. 15, 2017, entitled "Simulating Exploits for the Creation and Refinement of Detection Signatures," the contents of which are incorporated herein by reference.

FIELD

The present disclosure relates to network and computer security, and more specifically, to systems and methods for generating signatures to identify network traffic.

BACKGROUND

Computer and network security systems attempt to detect malicious network traffic and prevent the malicious traffic from accessing or modifying a computer network and network-accessible resources. Most security systems are either anomaly detection systems or signature detection systems. Anomaly detection systems identify particular events or data that sufficiently deviate from "normal" traffic. Signature detection systems rely on examining network traffic for known, malicious signals, which indicate that such traffic should be prevented from accessing the network. Current anomaly detection systems can require extensive resources and time because identifying a deviation requires an accurate and developed understanding of "normal" traffic.

Signature detection systems are typically less resource expensive than anomaly detection systems, but signature detection systems can have limited accuracy because a system must have prior knowledge of the malicious signal. A system cannot always correctly classify traffic as malicious or associate certain signals with particular malicious traffic. Additionally, conventional signature detection systems can be thwarted through attack tools which constantly change the signature of an attack. Even advanced signature detection systems, such as Automatic Signature Generation (ASG), often fail to properly identify and qualify network traffic. Signatures identified by such systems can be noisy, prone to false positives or false negatives, and inefficient.

Some conventional security systems attempt to combine signature detection systems and anomaly detection systems by detecting malicious traffic and forwarding all of the malicious traffic, or samples of the malicious traffic, to an ASG system to generate signatures to describe the traffic. However, even these combination security systems suffer from significant flaws as there are no certain means to qualify real network traffic as malicious or innocuous. Such security systems can create signatures targeting normal innocuous traffic and can incorrectly cluster unrelated samples of network traffic. Incorrect clustering of unrelated samples of network traffic results in the creation of inaccurate signatures as the signatures are attempting to characterize unrelated traffic which has no unifying pattern. Therefore, such security systems tend to create signatures that suffer from ambiguity or require multiple signatures to adequately describe all malicious exploits captured.

Other conventional security systems attempt to mitigate the aforementioned problems by combining an ASG system with a so-called honey pot. Honey pots are systems designed to attract and study malicious activity by allowing malicious actors to exploit the system. The honey pot can, in turn, correctly qualify network traffic as malicious. However, by definition, honey pots are exposed to rogue actors, which allows rogue actors to identify and circumvent the security system. Consequently, rogue actors can successfully circumvent the security system.

Therefore, what is needed is a system which does not confuse innocuous traffic with malicious traffic. An exemplary system can properly cluster traffic to allow successful signature creation. An exemplary system can also further create unambiguous, variant-resistant signatures to identify exploits.

SUMMARY

The various examples of the present disclosure are directed towards systems and methods of generating and characterizing network traffic. A first embodiment of the present disclosure can provide a method for generating samples of network traffic. Each sample of the network traffic can be configured to attempt to gain unauthorized access to a target computing device. The method can comprise first receiving an exploit script at a host device. The exploit script can enable a sample generator at the host device to attempt unauthorized access to the target computing device. The method can then generate traffic between a sample generator and the target computing device based on the exploit script. The sample generator can be located at the host device. The method can provide for collecting a plurality of samples of the generated traffic. The plurality of samples can then be stored in a storage device. An exemplary storage device can be accessible by the host device.

In some examples of the first embodiment, each sample in the plurality of samples can include at least one variable portion.

In some examples, each sample in the plurality of samples can include a portion which is distinct from the remaining portions in the plurality of samples.

In some examples, each sample in the plurality of samples can include variable portions and invariant portions. The invariant portions can have identical values for different generations of the exploit script. The variable portions can have unique values for different generations of the exploit script.

In some examples, the generated traffic can occur via a separate and private network between the host device and the target computing device.

In some examples, the method can further provide for determining at least one characteristic of the exploit from the collected plurality of samples to detect the exploit.

A second embodiment of the present disclosure can provide a system for generating samples of network traffic. The system can include a target computing device, a storage device, and a host device. The host device can include a sample generator. The host device can be configured to conduct a series of steps as provided for in the first embodiment.

A third embodiment of the present disclosure can provide a non-transitory machine-readable medium. The medium can have stored instructions for performing the method of generating samples of network traffic. The non-transitory machine-readable medium can include machine executable code. When executed by at least one machine, the machine executable code can cause the machine to perform a series of steps as provided for in the first embodiment.

A fourth embodiment of the present disclosure can provide for a method for characterizing an exploit. An exploit script can be provided by a first computing device and can configure the first computing device to attempt unauthorized access of a target computing device via a network. The method can include first generating a plurality of samples of the exploit using the exploit script. Each sample can include invariant portions and variable portions. The method can then provide for removing at least one artifact from each sample in the plurality of samples. An artifact can be any portion of the sample which is non-essential to access the target computing device. The method can then provide for constructing a plurality of regular expressions for the plurality of samples. Each regular expression in the plurality of regular expressions can represent a pattern for matching invariant portions of the exploit script. The method can then provide for testing each regular expression in the plurality of regular expressions on the plurality of samples. This testing step can yield test result data. The method can conclude by ranking each regular expression in the plurality of regular expressions according to a ranking metric and the test result data.

In some examples, the at least one artifact can include at least one of an IP address, a date, a fixed binary string, and a fixed textual string.

In some examples, the at least one artifact can be identified based on a known list of regular expressions.

In some examples, the constructing step can further include identifying and removing inefficient regular expression features from each expression in the plurality of regular expressions.

In some examples, the test result data can include a false positive rate, a false negative rate, or an ambiguity level for each of the expressions. In some cases, the test result data can further include an indication of whether a selected regular expression matches a perfect factor of a number of the plurality of samples.

In some examples, the ambiguity level can include a probability of a match based on a selected regular expression.

In some examples, the ranking step can further include ranking regular expressions with higher false negative rates lower than regular expressions with lower false negative rates.

In some examples, the ranking step can include ranking regular expressions with higher false positive rates lower than regular expressions with lower false positive rates.

In some examples, the ranking step can include ranking regular expressions which match a perfect factor of the number of the plurality of samples higher than regular expressions which do not match a perfect factor of the number of the plurality of samples.

In some examples, the ranking step can further include ranking regular expressions with higher ambiguity levels lower than regular expressions with lower ambiguity levels.

A fifth embodiment of the present disclosure can provide a system for characterizing an exploit. The system can include a first computing device, a target computing device, and a network. The network can be configured to allow communication between the first computing device and the target computing device. An exploit script can be located at the first computing device. The exploit script can be configured to attempt to access the target computing device via the network. The first computing device can be configured to conduct a series of steps as provided for in the fourth embodiment.

A sixth embodiment of the present disclosure can provide a non-transitory machine-readable medium. The medium can have stored instructions for performing the method of generating samples of network traffic. The non-transitory machine-readable medium can include machine executable code. When executed by at least one machine, the machine executable code can cause the machine to perform a series of steps as provided for in the fourth embodiment.

The words "computer system," "computing system," and "server system" are all used interchangeably in the present disclosure, and can identify any electronic computing system for storing and processing data. Such an electronic computing system can include, but not be limited to, a personal computer, a laptop computer, a tablet, and a commercial or private server system.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
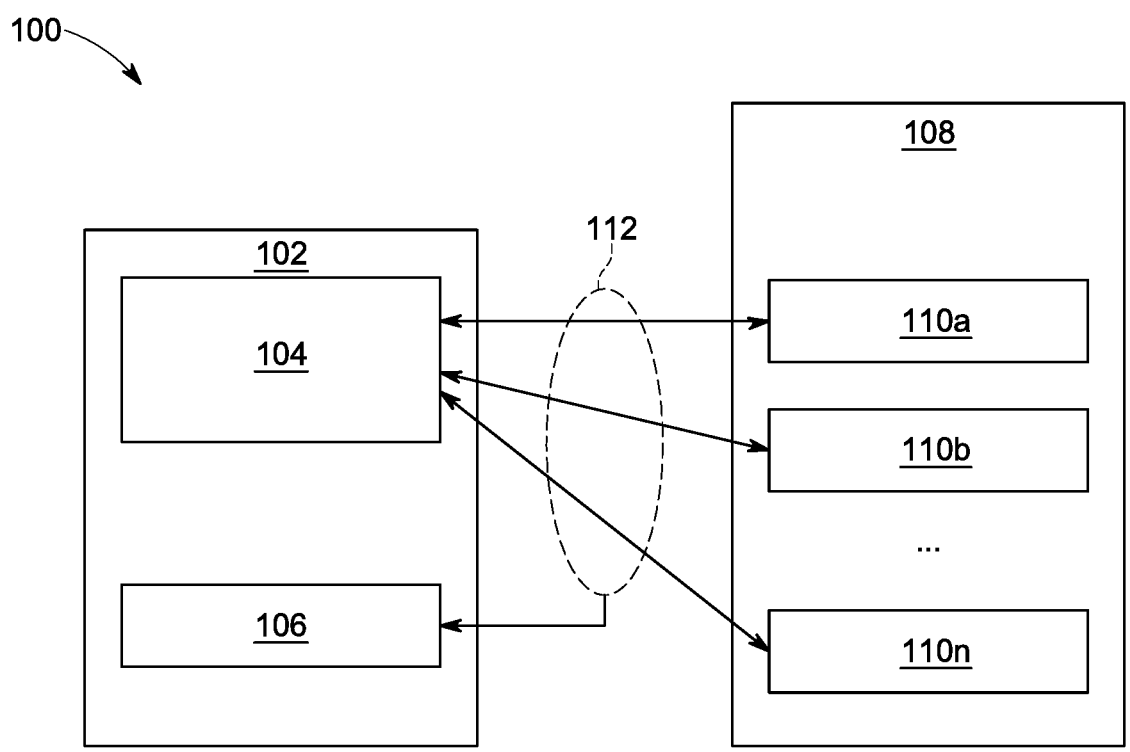
FIG. 1 shows a schematic diagram of an exemplary isolated security system, according to an embodiment of the present disclosure.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed to systems and methods configured to generate a set of samples for any given exploit. The samples can be generated in an isolated computer system. The set of samples can be generated with various permutations of all variable fields between each generation. The present disclosure further provides for generating a signature for a related set of samples. The signature can be generated by first removing artifacts and then identifying invariant tokens. The invariant tokens can be converted into regular expressions and refined for simplicity. The regular expressions can then be tested for accuracy based on their ability to match the related set of samples without false positives or false negatives. A best regular expression can be chosen to represent the exploit after testing all the constructed regular expressions.

Therefore, the present disclosure provides a system which can synthetically generate samples of network traffic without external reliance on a honey pot or other means of determining the nature of the traffic. Additionally, no clustering is needed as sets of samples can be generated from a particular exploit known to be malicious. Such a system has no reliance on external security systems and can therefore require lower initial cost, easier maintenance, and have little risk of circumvention by malicious actors. Furthermore, signatures created according to the exemplary security system are far more resilient to variance and obfuscation. Additional, non-limiting advantages of the present disclosure are disclosed below.

FIG. 1 shows a schematic diagram of an exemplary isolated security system 100 according to an embodiment of the present disclosure. Security system 100 can include a sample generator 102; an exploit framework 104; a captured sample storage 106; a virtual machine host 108; a plurality of target operating systems 110a, 110b, and 110n; and network communications 112. Notably, all components and processes of security system 100 can be located within an isolated computer system, such that security system 100 is not connected to any internet network. The components may be separate computing devices or parts of the same computing device.

Security system 100 can provide for an exploit framework 104 hosted within the sample generator 102 such that the sample generator 102 can execute scripts from the exploit framework 104. An exemplary exploit framework 104 can contain multiple exploits. Each exploit can have multiple scripts, where a script is a codified implementation of the exploit. The script controls the interactions between the sample generator 102 and any target operating systems (such as systems 110a, 110b, and 110n) by sending data and responding to replies. The script, therefore, generates actual traffic (e.g., network communications 112) to target a system and attempt the exploit. Scripts can have invariant portions, which are necessary for the exploit to function; and remaining, variant portions, which can vary according to possible values defined by the script and are not necessary for the exploit to function (exemplary scripts are depicted and discussed further with regard to FIGS. 4A-5B). In general, the script can randomize the variant strings, such that upon each iteration of the script, the variant data will change. This variability can help prevent identification of the attack by security systems which identify an attack but fail to properly remove all variant portions when saving an instance of the exploit script for future reference.

In some cases, an exemplary exploit framework 104 can be Metasploit, or any other exploit creation framework known in the art or available on the Internet (e.g., the exploit database www.exploit-db.com). Metasploit, or other similar frameworks, can allow an exemplary computer system 100 to quickly and easily create variations of any exploit that has an associated script.

The sample generator 102 can select a script from the exploit framework 104 and select a target operating system 110a, 110b, or 110n. Each execution by the sample generator 102 includes one or more network communications 112 between the sample generator 102 and the target operating systems 110a, 110b, and 110n. Target operating systems 110a, 110b, and 110n can be hosted in a virtual machine host 108 or can be separate external computing devices. In some cases, there can be a variable number of target operating systems, where the variable number is a number determined by a user. Although FIG. 1, demonstrates testing on a single virtual machine host 108, there is no restriction that the simulation environment be virtual or confined to a single machine. A viable target operating system may include any operating system running on a personal computer, network server, or device which can be added to a local network and accessed by an attacker. Generally, the only requirements are that the target device (in this case, virtual machine host 108) is accessible by the host device (in this case sample generator 102), and that an exploit exists against the target device.

The sample generator 102 can run the scripts in multiple iterations to select different values from the possible values defined by the script and the exploit framework 104. For example, the sample generator 102 can run a separate script for each target operating system 110a, 110b, and 110n. At the end of each iteration, the sample generator 102 must refresh the targeted operating system 110a, 110b, or 110n to a pristine status (or reset to an initial state) such that the effects of the exploit are removed. Therefore, a new iteration or exploit can be run on the targeted operating system 110a, 110b, or 110n without potential corrupting influence from prior exploits or iteration.

All communications between the sample generator 102 and the target operating systems 110a, 110b, and 110n can be captured by a sample capture process of the sample generator 102 which captures all network communications 112. In order to avoid contamination of the captured samples, the sample generator 102 and the virtual machine host 108 is a private, isolated network in this example. Exemplary private networks exist alone, isolated from the internet, and can be private IP addresses, local area networks, or other offline systems. Often, private networks are isolated to a single room or geographic building. Without access to an external, online network, rogue actors who might wish to subvert the signatures or security of a system as a whole must gain physical access to the isolated network in order to corrupt generated signatures. Therefore, in system 100, signatures generated based on the communication can be guaranteed to have higher accuracy than online systems because online systems are exposed to considerable risk of abuse by rogue actors.

The sample capture process can send the captured communications 112 to a captured sample storage 106. The sample capture process can be configured to designate which exploit script was used and which target operating system was associated with each captured communication 112.

Security system 100 can support other samples captured from an online network, as well. For example, legacy computer security systems typically harvest samples of exploits through forensic capture (after-action forensic operations which identify exploit samples from logs), from direct observation (e.g., honey pots), or through anomaly detection systems (which flag newly anomalous traffic). Any of these harvested samples can be stored in the sample storage 106 and used by security system 100 to generate signatures. In some cases, the harvested samples can be properly labeled and placed in the correct class of exploits such that the harvested samples are properly clustered with system 100's captured samples. Additionally, samples generated by security system 100 can be transferred to and used by legacy systems for signature generation. Therefore, security system 100 can support legacy computer security systems while also providing novel functionality through use of an offline system.

Security system 100 further provides for sets of samples in the captured sample storage 106 for exploits. These sets of samples which can be easily analyzed to characterize the corresponding exploits (for example, as discussed with respect to FIG. 6). Furthermore, because the set of samples can be rigorously mutated through all the iterations, analysis can be far more resilient to variance and obfuscation.

Figure 2:
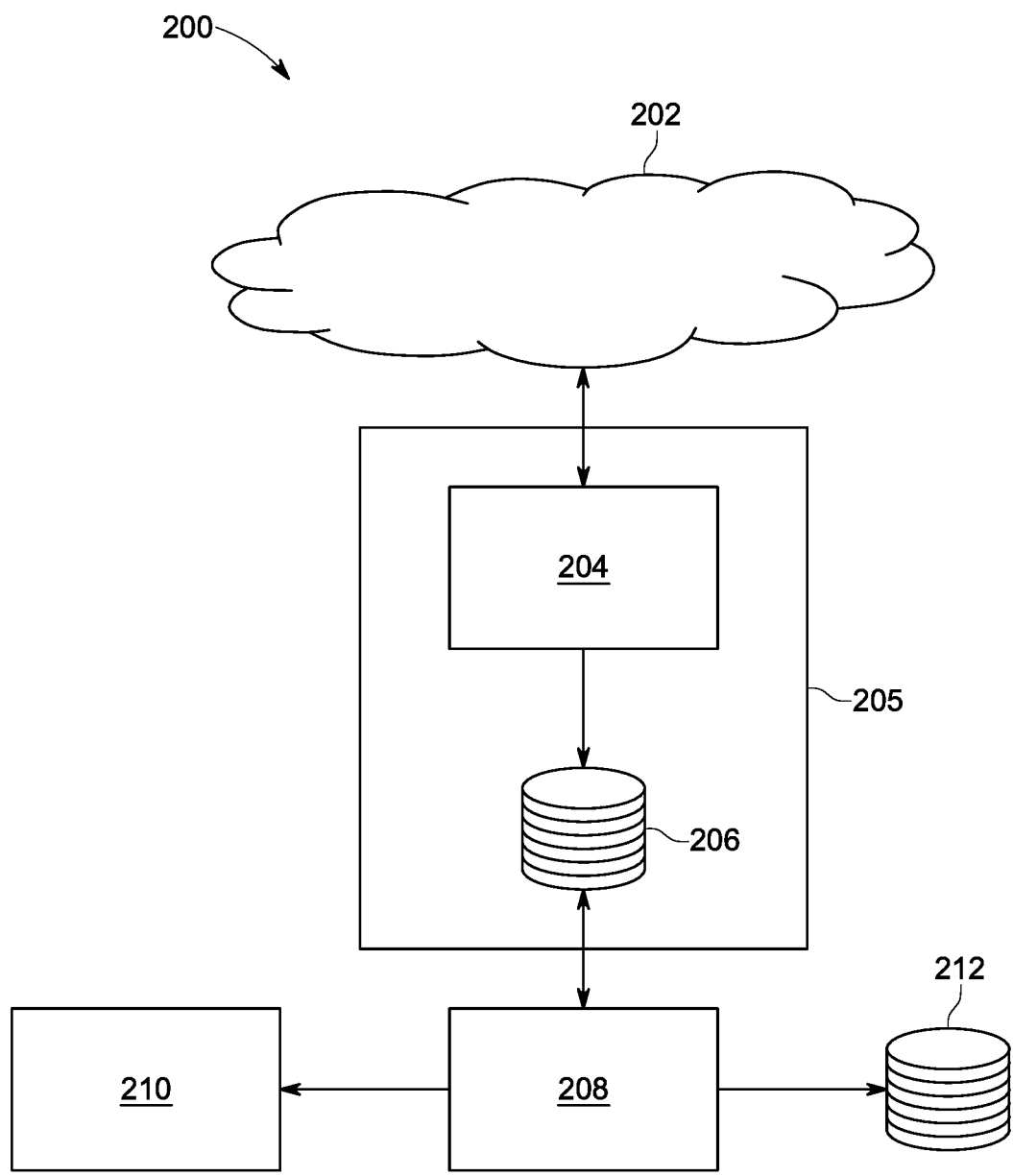
FIG. 2 shows a schematic diagram of an exemplary network-connected security system, according to an embodiment of the present disclosure.

FIG. 2 shows a schematic diagram of an exemplary network-connected security system 200, according to an embodiment of the present disclosure. Security system 200 can include an online network 202; an intrusion detection system 204; a host machine 205; an intrusion rules set 206; a signature generation system 208; captured traffic samples 210; and an exploit database 212.

An intrusion detection system 204 can operate on a host machine 205 to review all traffic passing into the host machine 205 from the online network 202. The intrusion detection system 204 can alert system administrators if malicious traffic is detected from the online network 202. The intrusion detection system 204 can evaluate traffic from the online network 202 based on an intrusion rules set 206. The intrusion rules set 206 can hold a database of signatures of malicious exploits. In some cases, the database of signatures can exist separately from, but accessible to, the host machine 205. The intrusion detection system 204 can additionally be configured to receive exploits from an exploit database 212 to detect and generate signatures.

The signature generation system 208 can generate signatures of exploits based on sets of related samples captured from local traffic samples 210 or captured by the intrusion detection system 204 from the online network 202. For example, the local traffic samples 210 can be captured from data within a private network security system 100 as described with respect to FIG. 1. Referring back to FIG. 2, the signature generation system 208 can, in some cases, identify related sets of samples between samples from the online network 202 and samples from the local traffic 210. Therefore, signatures generated by the signature generation system 208 can be further refined and optimized with data collected from additional samples. The signature generation system 208 can create signatures for exploits according to the method discussed in FIG. 6, for example.

Referring back to FIG. 2, network system 200 therefore provides automatic updates of the intrusion detection system 204 with new exploits. New exploits can be located in local traffic within network system 200, online traffic or data from the network 202, or transferred from an isolated system.

Updates from an isolated system to an online system can occur, for example, through a one-way push where the data is simply moved from the isolated system (for example, system 100 of FIG. 1) to a directory (such as exploit database 212) in the online system (for example, system 200 of FIG. 2) through a router that only allows traffic out. In other instances, a user can physically update the online system by copying new signatures from the isolated system to the online system.

For example, new exploits can represent zero-day exploits that have been identified and catalogued in the open source community. Network system 200 allows the adoption of new exploits without waiting for an external vendor to provide an update to the exploit database. Additionally, network system 200 can use local traffic to optimize its signature generation system 208 (discussed further with respect to FIG. 6).

Figure 3:
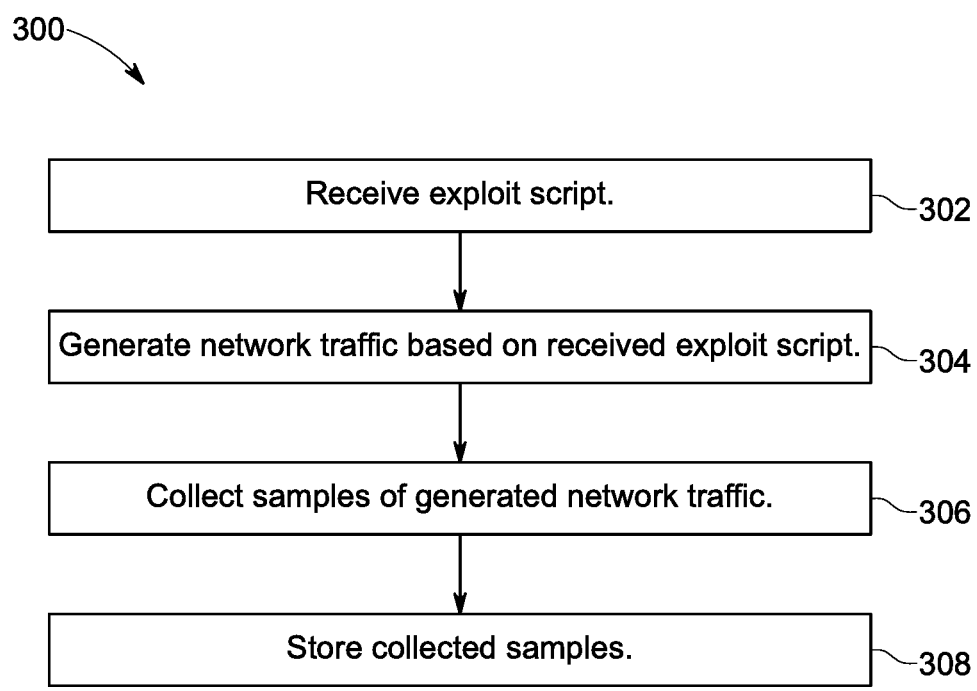
FIG. 3 shows a flow diagram of an exemplary method for collecting exploit traffic samples, according to an embodiment of the present disclosure.

FIG. 3 shows a flow diagram of an exemplary method 300 for collecting exploit traffic samples, according to an embodiment of the present disclosure. Method 300 can be implemented by the system 100 in FIG. 1 or the system 200 in FIG. 2, as discussed previously.

Referring back to FIG. 3, method 300 can provide for first receiving an exploit script at step 302. In some cases, an exploit script can be selected from a database of exploit frameworks, such as Metasploit or any other exploit database known in the art or available on the Internet.

In step 304, method 300 can provide for generating network traffic based on the received exploit script. An exemplary exploit script can use an exploit framework to generate network traffic. Step 304 can provide for running the exploit script multiple times to generate a set of related samples. The generated samples are related because they are produced from the same exploit script. Each execution of the exploit script can create communications between a host machine (where the exploit script is executed, such as sample generator 102 of FIG. 1) and a target machine (which the exploit script attempts to attack, such as target operating systems 110a, 110b, and 110n of FIG. 1).

The script and the framework can be configured to randomize unnecessary portions of the exploit. Therefore, each run of the script can create exploit traffic with invariant tokens constant across multiple iterations of the script while remaining portions of the script contain random data. In some cases, remaining portions can have possible values defined by the exploit script which are not truly random. In other cases, remaining portions of the exploit script can be completely random such that they can include any available ASCII characters. The script can have a set number of iterations, and step 304 can run through all possible iterations to provide a complete sample set for the exploit. Therefore, all possible values defined by the exploit will be provided in at least one of the executed iterations.

In step 306, method 300 can provide for collecting samples of the generated network traffic. Each sample can comprise all of the communications between the host machine and the target machine. The sample can be saved in a packet capture designating the exploit and the iteration. A packet capture can preserve the unabridged data that made up the exploit in the form that was used to realize the exploit. This allows the sample to be used directly in the creation of signatures. Step 306 can capture the samples concurrently as the samples are generated according to step 304.

After capturing the samples in step 306, the method 300 can proceed to step 308 where the captured samples are stored. For example, the captured samples can be stored in a captured sample storage 106 as shown in FIG. 1.

Therefore, method 300 of FIG. 3 provides a process which synthetically generates samples of data from known malicious exploits without relying on any assistive measure such as a honey pot. Additionally, all samples in a set of samples are guaranteed to be related and properly clustered as each set of data is generated from a single common exploit. Each set of samples can then be forwarded to a system for creating signatures to analyze the exploits (for example the system 200 of FIG. 2). An exemplary method of creating such signatures is discussed further with respect to the flow diagram of FIG. 6.

Figure 4A:
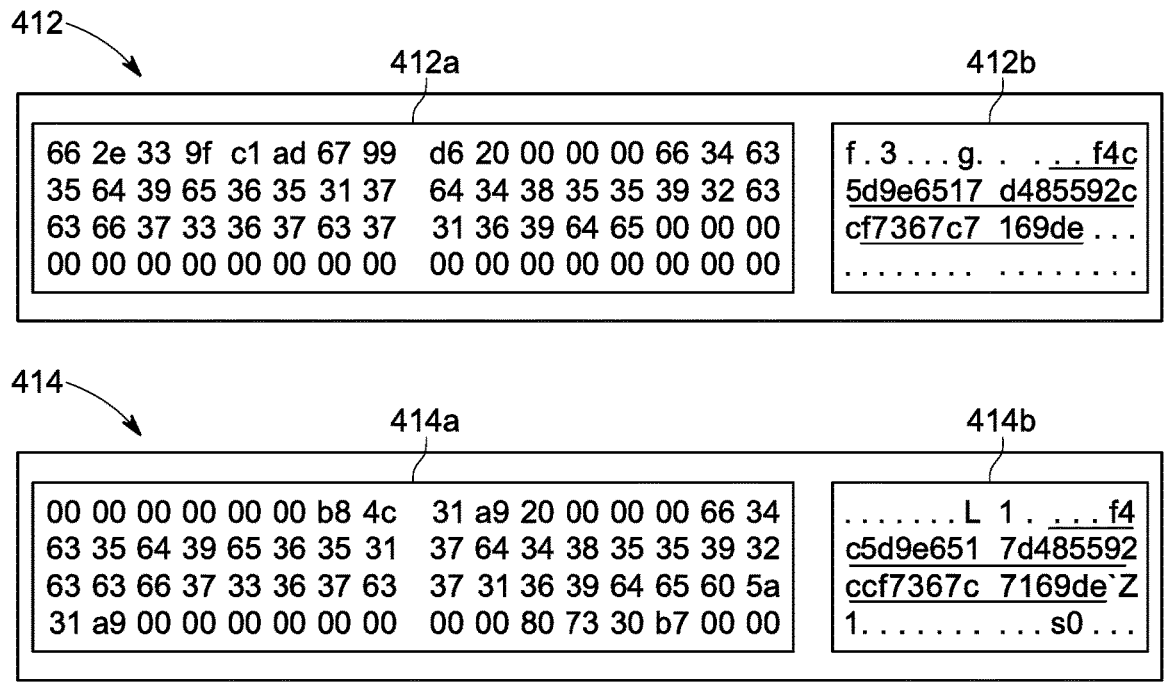
FIGS. 4A-4B show exemplary exploits and their corresponding variants, according to an embodiment of the present disclosure.
Figure 4B:
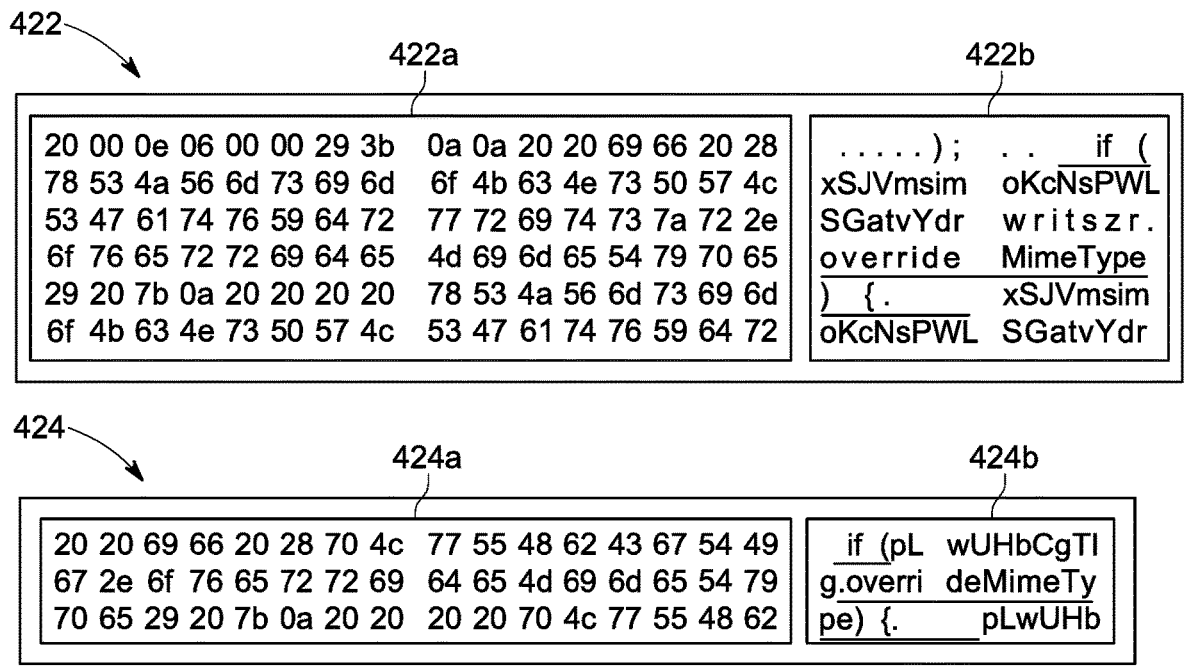

FIGS. 4A-4B show exemplary exploits and their corresponding variants, according to an embodiment of the present disclosure. FIG. 4A shows excerpts from two mutations 412 and 414 of Heartbleed exploits as packet dumps. FIG. 4B shows two mutations 422 and 424 of a Use-after-free exploit. In each mutation 412, 414, 422, and 424, 412a, 414a, 422a, and 424a represent the binary data while 412b, 414b, 422b, and 424b represent a translation of the binary data into ASCII characters. The ASCII portions 412b, 414b, 422b, and 424b further include underlined portions. FIGS. 4A and 4B demonstrate that the underlined portions of the exploits remain identical even in the face of variation elsewhere in the exploit. These portions can be referred to as invariant tokens. Invariant tokens can be any binary or textual strings of contiguous characters, where the string is at least one in length. These invariant tokens represent portions of an exploit that must remain fixed in order to execute the desired exploit. Thus, the invariant tokens, once identified may be used to detect and neutralize exploits.

Figure 5A:
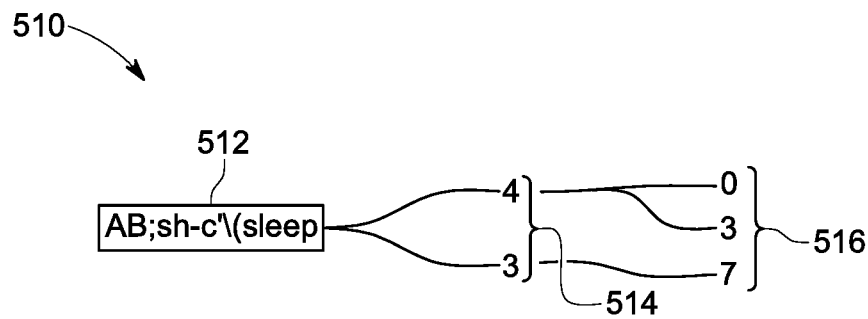
FIGS. 5A-5B show tree representations of how invariant tokens can combine with variant tokens, according to an embodiment of the present disclosure.
Figure 5B:
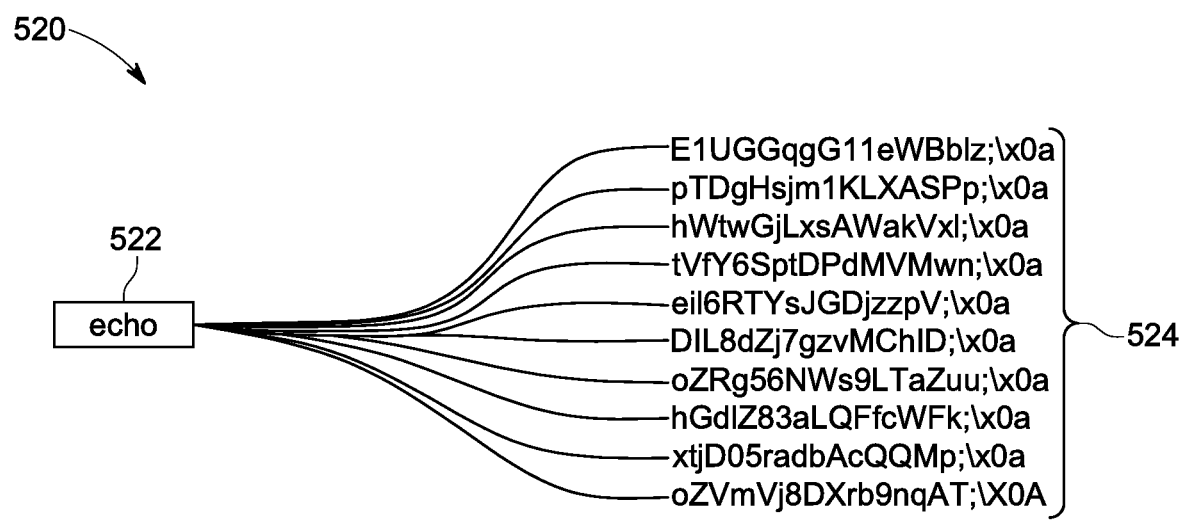

FIGS. 5A-5B show tree representations of how invariant tokens can combine with variant tokens, according to an embodiment of the present disclosure. FIG. 5A shows how an exemplary exploit script 510 can have an invariant token 512 that can be followed by a first limited set of variable tokens 514. Each token in the first limited set of variable tokens is followed by a second limited set of variable tokens 516. For example, the invariant token 512 can be 'AB; sh—c\(sleep' which is followed by variable tokens '40', '43', or '37', according to the permissible variations 510.

FIG. 5B shows how an exemplary exploit script 520 can have an invariant token 522 followed by any given sequence in a set of possible sequences 524. Exploit script 520 demonstrates that after the invariant token 'echo' 522, there can be a variable token which is a completely random binary sequence of 16 characters. Exploit script 520 therefore has a random field which includes values selected from a possible set of values 524.

Therefore, FIGS. 4A-5B demonstrate exemplary invariant and variable tokens of particular exploits. Invariant tokens remain fixed in every sample while variant tokens will devolve into random noise. The invariant tokens can then be cleaned and compared to common tokens to ensure that those that remain are the most unique set of invariant tokens for a particular sample set.

Figure 6:
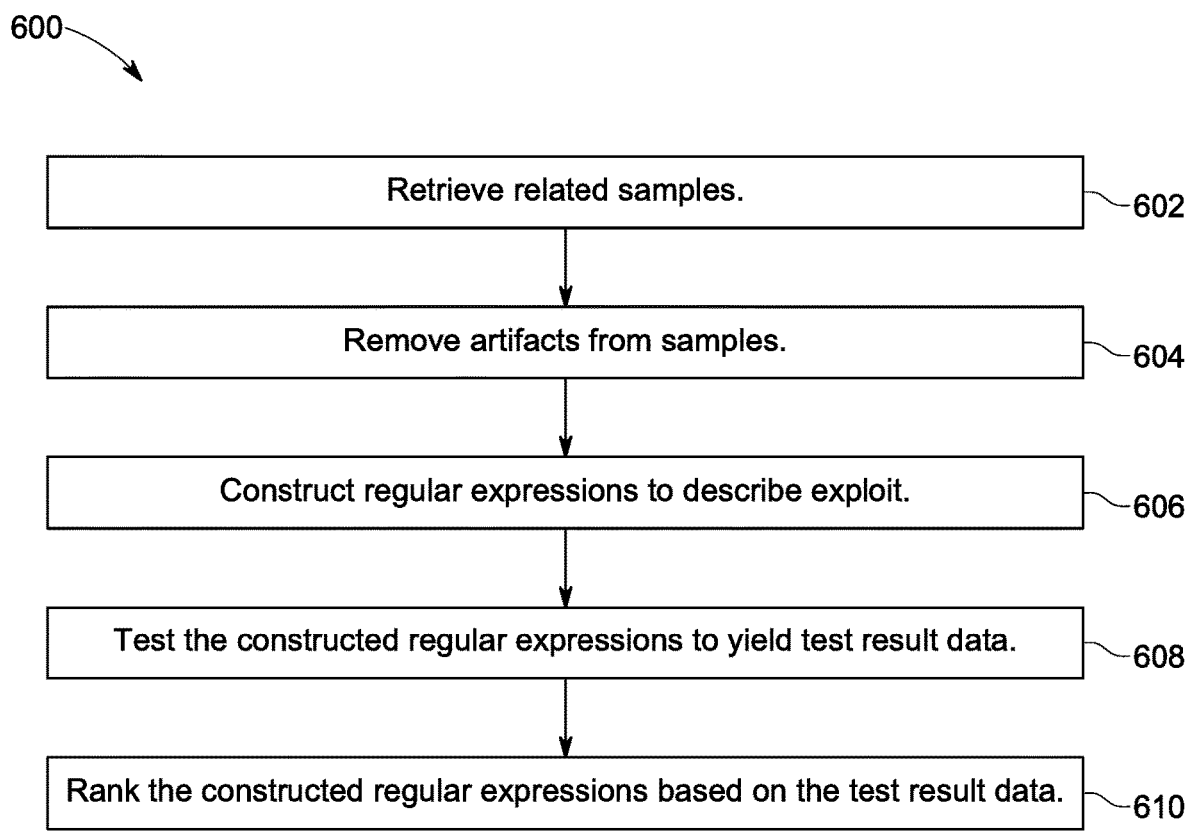
FIG. 6 shows a flow diagram of an exemplary method for creating a signature for an exploit, according to an embodiment of the present disclosure.

FIG. 6 shows a flow diagram of an exemplary method 600 for creating a signature for an exploit, according to an embodiment of the present disclosure. Method 600 can commence immediately after a method which generates a set of samples of an exploit. Such an exemplary method is described above with respect to FIG. 3. Additionally, method 600 can be performed on a system 100 or system 200, as discussed previously.

Referring back to FIG. 6, method 600 first provides for retrieving related samples at step 602. The related samples can be any set of samples generated according to the methods discussed previously, so long as the set of samples is correctly clustered to includes scripts from a single exploit.

Method 600 can then provide for removing artifacts from each of the samples in step 604. Artifacts can include IP addresses, dates, fixed binary strings, or fixed textual strings resulting from the exploit framework and/or the generation framework. For example, in a laboratory or isolated computer system, the number of IP addresses used can be often limited. As such, these IP addresses run the risk of being identified as invariant tokens when the IP addresses are just a necessary feature of the simulation environment. Similarly, dates tend to get picked up as invariant tokens because iterations of the tests can occur so quickly (within seconds for each iteration) that most of the date remains identical between iterations.

These artifacts can be known to a security system for automatic removal. Artifacts can be known to the system in a variety of ways. Artifacts which are related to the architecture of the system can be known to the test environment. These artifacts are easily identified and noted in a list which is used to remove these artifacts from the traffic. Artifacts which are related to time can have a generally known data format. Therefore, the presence of date artifacts can be identified through fields or regular expressions and can be easily removed. Artifacts which are related to the exploit framework (such as error messages) can also be known, maintained in a list, and removed from the data as necessary. In general, a list of regular expressions matching any known artifacts can be maintained by such a security system. Artifact removal can be a simple process of using standard find-and-replace functionality for regular expressions to identify artifacts in the samples and then remove the identified articles from all samples in the sample set.

Any remaining artifacts, especially artifacts which do not appear in every sample (or nearly every sample) will be randomized away and ignored as a matter of course. Such artifacts would be flagged as a variable portion and removed.

Method 600 can then provide for constructing regular expressions to describe the exploit in step 606. The regular expressions can be constructed based only on invariant tokens identified among all the samples. The regular expressions can be created as a combination of invariant tokens, or as a combination of how variant and invariant tokens play together. The present disclosure contemplates that an ASG process can be used in step 606 and any other technique known in the art. Step 606 can construct one or more regular expressions to describe the exploit.

In some cases, step 606 can further include refining the constructed one or more regular expressions. Refinement can occur according to any practice known in the art and non-limiting, exemplary refinements are discussed below with respect to FIGS. 7A-7C. In some cases, further refinement of the expressions can occur after the completion of method 600.

Method 600 can then proceed to test the constructed regular expressions to yield test results in step 608. For example, each of the constructed regular expressions can be run against every sample captured for the particular exploit to determine a false negative rating (i.e., how frequently the expression failed to detect the exploit). Each constructed regular expression can further be run against non-related exploits to determine a false positive rating (i.e., how frequently the expression incorrectly detected the exploit).

Step 608 can additionally determine whether, when tested against the set of samples, an expression has a number of matches equal to a number of the samples or a factor of the number of samples. Matching a perfect factor of the number of samples implies that the matches occur symmetrically with each sample. Any expression which does not match a factor of the number of iterations implies some level of ambiguity in the expression.

Step 608 can provide for additional testing of the expressions according to any method which tests the accuracy or simplicity of the expressions. For example, a simpler expression can be more desirable than a complex expression because of the reduced requirement for computing power to detect the simpler expression. In all cases, simpler regular expressions produce small, less-complex finite automata. Such a smaller, simpler finite automata representation requires less state changes to match a sample, a smaller data structure to represent the matching finite automata, and can further increase the likelihood of the matching finite automata residing in cache memory (which, in turn, maximizes matching efficiency).

Finally, in step 610, method 600 can provide for ranking the constructed regular expressions. Expressions with higher rates of false negatives and false positives can receive lower ranking than expressions with lower rates of false negatives and false positives. Expressions with a number of matches not equal to a factor of the number of samples in the set of related samples receive a lower ranking than expressions that do match a perfect factor of the number of samples.

In some examples, particular test results from step 608 can be weighted more heavily in step 610 than other test results. For example, the expressions can be first ranked according to a false negative rate. A selection of the higher ranked expressions can then be ranked according to other metrics such as a false positive rate. Therefore, in the examples of the present disclosure where additional expression refinement happens at the completion of method 600, only a top-ranked portion of the expressions can be further refined. The number of expressions in such a portion can be determined by a user.

Therefore, method 600 can yield a ranked list of regular expressions to describe an exploit. The list can be written into a file, database, or other format (such as the intrusion rules set 206). All constructed expressions, or a user-selected number of constructed expressions can be written to the file or database. Constructed expressions with low rankings can be omitted. The saved expressions can therefore serve as input into an intrusion detection system, antivirus, or other pattern matching systems.

In some examples of the present disclosure, method 600 can be run for every exploit in a database of exploit scripts, or for a user-selected list of exploits. Once a user initiates method 600, the method 600 can continue autonomously until all exploits have been analyzed and a full list of effective constructed expressions is written to an output.

Figure 7A:
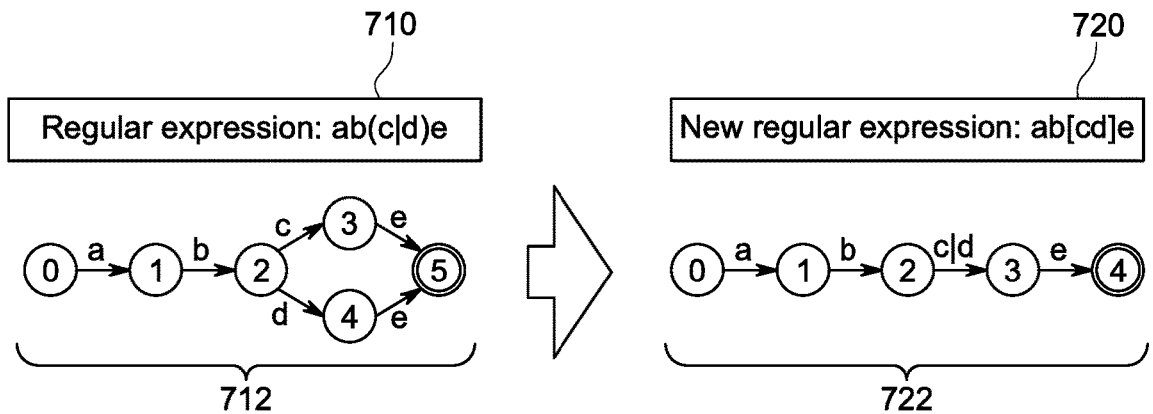
FIGS. 7A-7C show exemplary refinements of regular expressions, according to an embodiment of the present disclosure.
Figure 7B:
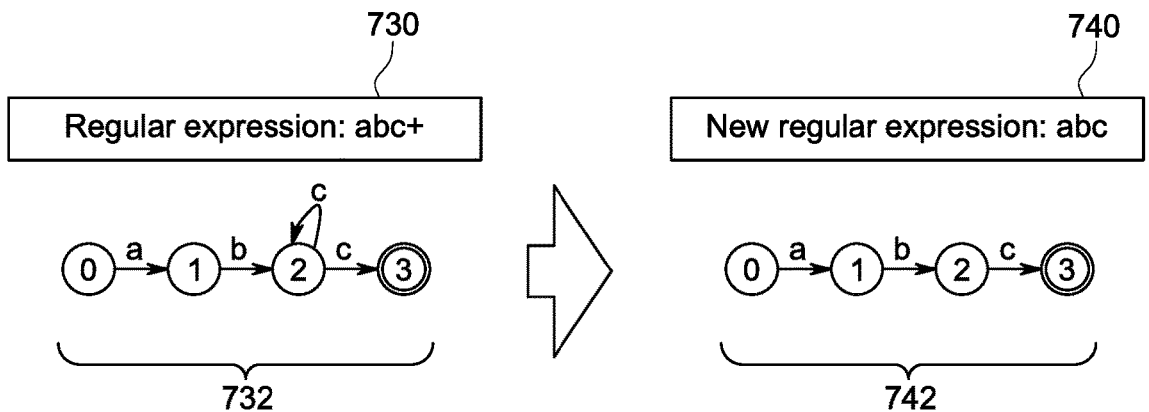
Figure 7C:
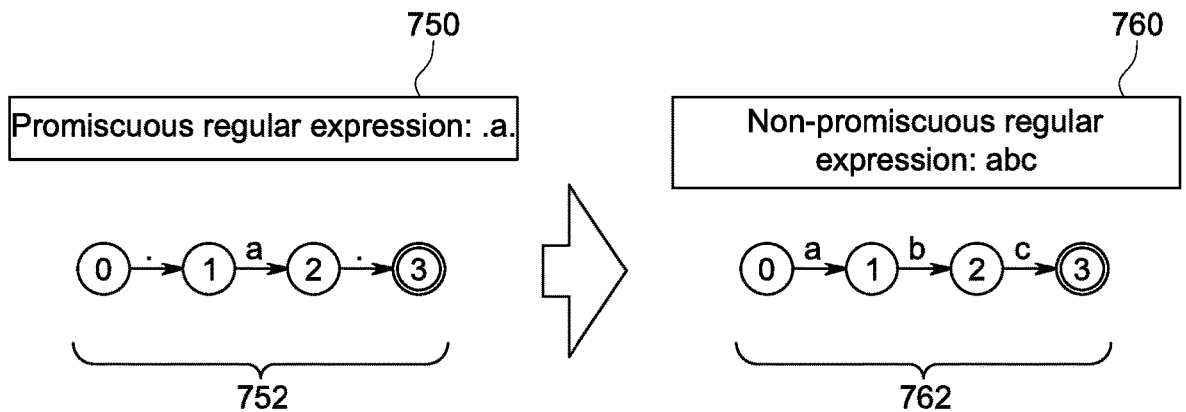

FIGS. 7A-7C show exemplary refinements or optimizations of regular expressions, according to an embodiment of the present disclosure. The regular expressions can be referred to as matchers. These refinements or optimizations can occur during step 606 of method 600 or after the completion of method 600 and can cure inefficiency of the expressions. Although exemplary processes are discussed herein with respect to FIGS. 7A-7C, any simplification or optimization processes of regular expressions known in the art can be used for purposes of the present disclosure.

Each matcher can be rendered into a non-deterministic finite automata (NFA), demonstrated as a directed graph (pictured in FIGS. 7A-7C). A refinement process can walk through the directed graph and identify inefficiencies. Refinements generally seek to limit the number of states in the directed graph. Every extra state in the directed graph creates a larger matcher which requires more memory. Such an increase in the memory can become exponential. Additionally, a larger matcher increases the likelihood of cache misses, where the memory needed for the next step is not currently in the cache memory and must be loaded separately. This can greatly slow the processing speed. Furthermore, every extra transition, especially the transitions that refer back to a state (described further with respect to FIG. 7B), increases the amount of matching states required during matching. Multiple transitions on the same character require multiple paths through the matcher that must be maintained. This can increase the runtime for matching because data must be tracked to manage all of the possible paths.

FIG. 7A demonstrates an optimization where groups (as shown in expression 710 and graph 712) can be converted into classes (as shown in expression 722 and graph 724). In matchers, groups can create branching. Branches are effectively sub-patterns to the entire pattern. Therefore, branching adds at least one extra state to the overall NFA, and can potentially add many more additional states. When branches are only a single character deep, the branches can be more concisely represented as character classes (also referred to as groups). Character classes are transitions of multiple characters to the same state.

For example, expression 710 provides an expression 'ab(c|d)e' where branching occurs in the graph 712 between state 2, and states 3 and 4. Therefore, expression 710 has five total states. Expression 710 can be simplified into expression 712 which simply transitions on more than one character to the same state and, consequently, has four total states.

FIG. 7B demonstrates an optimization where useless repetition at the end of an expression is removed. The constructed expressions of the present disclosure are used only for matching; thus, once a match is received, increasing the length of the match adds no benefit. Increasing the length of match can increase the required computing power and decrease the efficiency with matching.

For example, expression 730 provides a regular expression 'abc+'. This expression 730 will match the characters 'ab' followed by one or more 'c' (shown in graph 732). According to the optimization technique described above, the regular expression can be converted to expression 740 'abc' (shown in graph 742). Such an optimization removes a transition of the 'c' character at state 2 of graph 732 and creates a regular expression that is easier to match.

FIG. 7C demonstrates an optimization technique where regular expressions are scored according to a promiscuity of the expression. Promiscuity refers the likelihood of traveling deeper into the regular expression given a random input. Generally, matchers with ambiguous transitions are easier to match, and travel deeper into the expression, because the matcher accepts any character input. For example, if the starting character of a matcher is the 'any' character, during matching, the system must maintain an Active State from state 1, as well as match each new character against state 2. Therefore, the system has to maintain two paths for matching, one which starts from the beginning of the matcher, and one which starts from the second character. More ambiguity exacerbates this problem.

To calculate a promiscuity score, the general probability of reaching deeper into the regular expression is calculated by assuming a random input and simply determining the probability of reaching deeper into the regular expression. This requires examining a variety of probabilities for varying depths. For example, the basic probability of a match (i.e. a random input will match the string) can be the probability of all transitions. Each transition can be on a single byte of data offering 256 possible transitions for each byte.

For example, FIG. 7C illustrates 2 regular expressions: one is promiscuous and the other is not. The promiscuous regular expression 750 is '.a.' where the '.' allows any character at all. Thus, expression 750 will match any pattern that has an 'a' in it. This creates the graph 752, which while straightforward, is quite ambiguous. The regular expression at 760, 'abc', with corresponding graph at 762, will match only the characters 'abc'. It is therefore far more restrictive.

Since the '.' of expression 750 implies any transition in a regular expression, graph 752 shows that matching requires a transition between 0 and 1, 1 and 2, and then 2 and 3. Corresponding probabilities are 1, 1/256, and 1. Thus, the probability of a match for expression 750 is 1/256 (assuming an input of 3 characters). However, for expression 760, the requisite probabilities are instead 1/256, 1/256, and 1/256 for a probability of $(1/256)^3$. This probability is orders of magnitude smaller than the probability for a match for expression 750.

Step 608 of FIG. 6 can use the probability calculation described above with respect to FIG. 7C such that each constructed expression is scored using probability calculation dependent on the NFA of the regular expression and theoretical length of an input (the length can be chosen by the user). The expressions can then be ranked in step 610 in ascending order by this value.

Figure 8A:
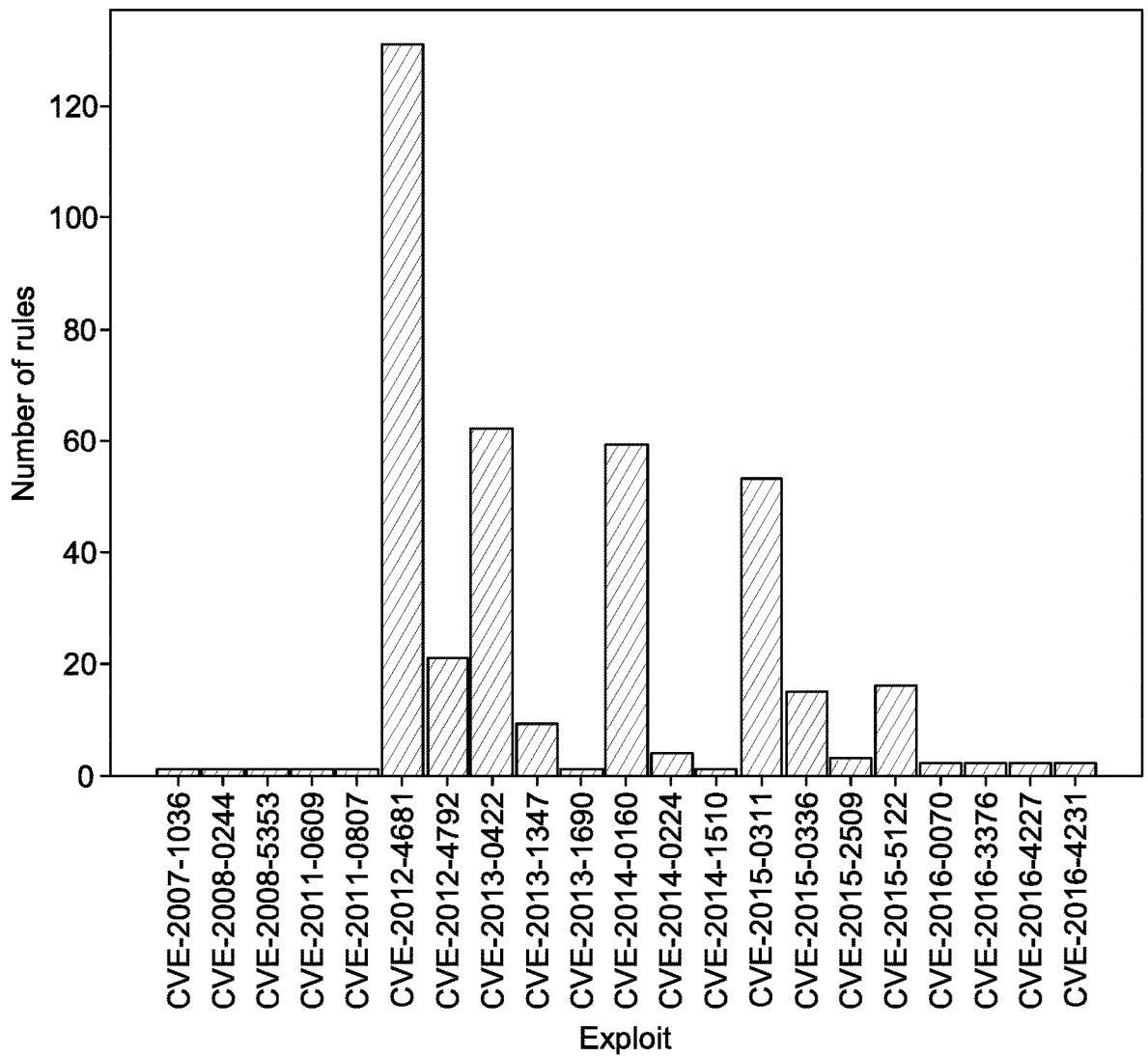
FIG. 8A shows a bar graph of the number of signature rules required to identify particular exploits, according to conventional methods of creating signatures.

FIG. 8A shows a bar graph of the number of signature rules required to identify particular exploits, according to conventional methods of creating signatures. FIG. 8A illustrates a number of Snort rules targeting a given exploit for registered users of the Snort Rule Set in January 2017. The y-axis identifies a number of rules targeting the exploit and the x-axis represents a given exploit. Two-thirds of the exploits have more than one signature; roughly one third have more than fifteen signatures and roughly one-fifth have more than 50 signatures. Such redundancy of signatures makes matching less efficient both in managing the results as well as the increased effort required to match the additional constructed expressions. As such, it is desirable to have only one rule per exploit where possible. Ensuring that all exploits in a sample set share a common exploit can eliminate the need to have more than one signature per exploit. Therefore, FIG. 8A shows the failures of conventional methods to effectively derive expressions for particular exploits.

Figure 8B:
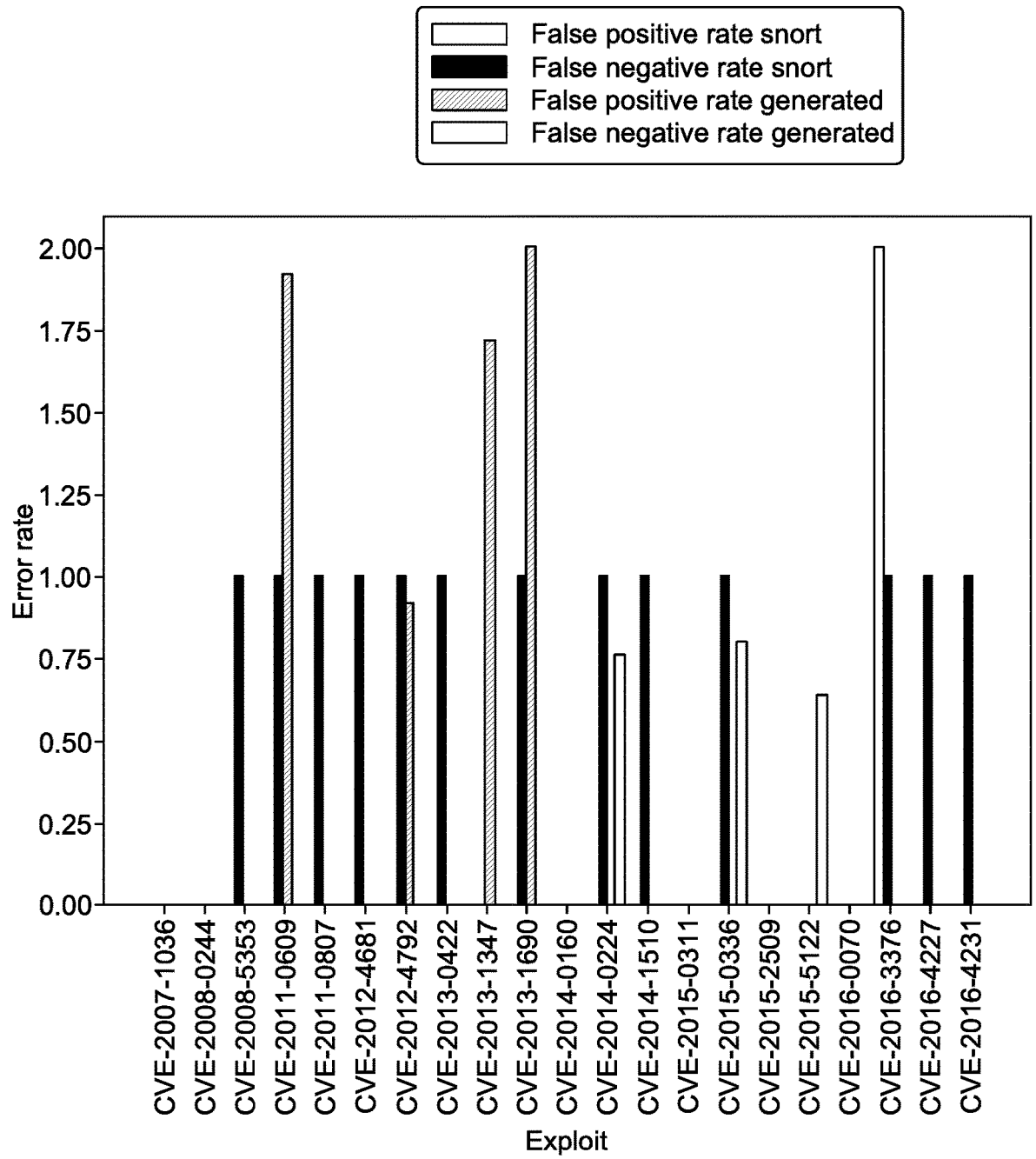
FIG. 8B shows a bar graph of the number of signature rules required to identify particular exploits, according to an exemplary embodiment of the present disclosure.

FIG. 8B demonstrates the effectiveness of the above described methods for creating regular expressions to match exploits. FIG. 8B shows the results for 21 exploits as analyzed through an embodiment of the present disclosure. For each of these exploits exactly one constructed expression was chosen. The registered users Snort rule set for January 2017 was used in comparison. FIG. 8A shows how conventional methods often require multiple Snort rules for each exploit. FIG. 8B shows single expressions for each exploit. FIG. 8B further illustrates the relative false positive and false negative rates.

Additionally, the methods in the present disclosure produced four signatures that registered false positives and three signatures that produced intermittent false negatives (false negatives for some ratio of the test iterations but not for all iterations). By contrast, the Snort rule set of FIG. 8A registered thirteen complete false negatives where the Snort rule set failed to match the exploit at all; this occurred despite the fact that some exploits were targeted by multiple signatures. The Snort rule set additionally had a single false positive where one signature matched against two other exploits but not the exploit for which it was designed. The generated signatures, according to an embodiment of the present disclosure, matched 18 of 21 exploits without any false negatives while the Snort signatures matched only 8 of 21. Thus, the generated signatures of the present disclosure doubled the number of exploits recognized by the system. In fact, the ratio is even better as the false negatives registered by the generated signatures affected only one of two, or fewer, iterations for those exploits. Thus, those three false negatives for the generated signatures still matched in some cases while the thirteen missed by the Snort rules never matched at all across all test iterations. Therefore, a comparison of FIGS. 8A and 8B shows the superiority of the methods of the present disclosure to produce accurate results.

Figure 9:
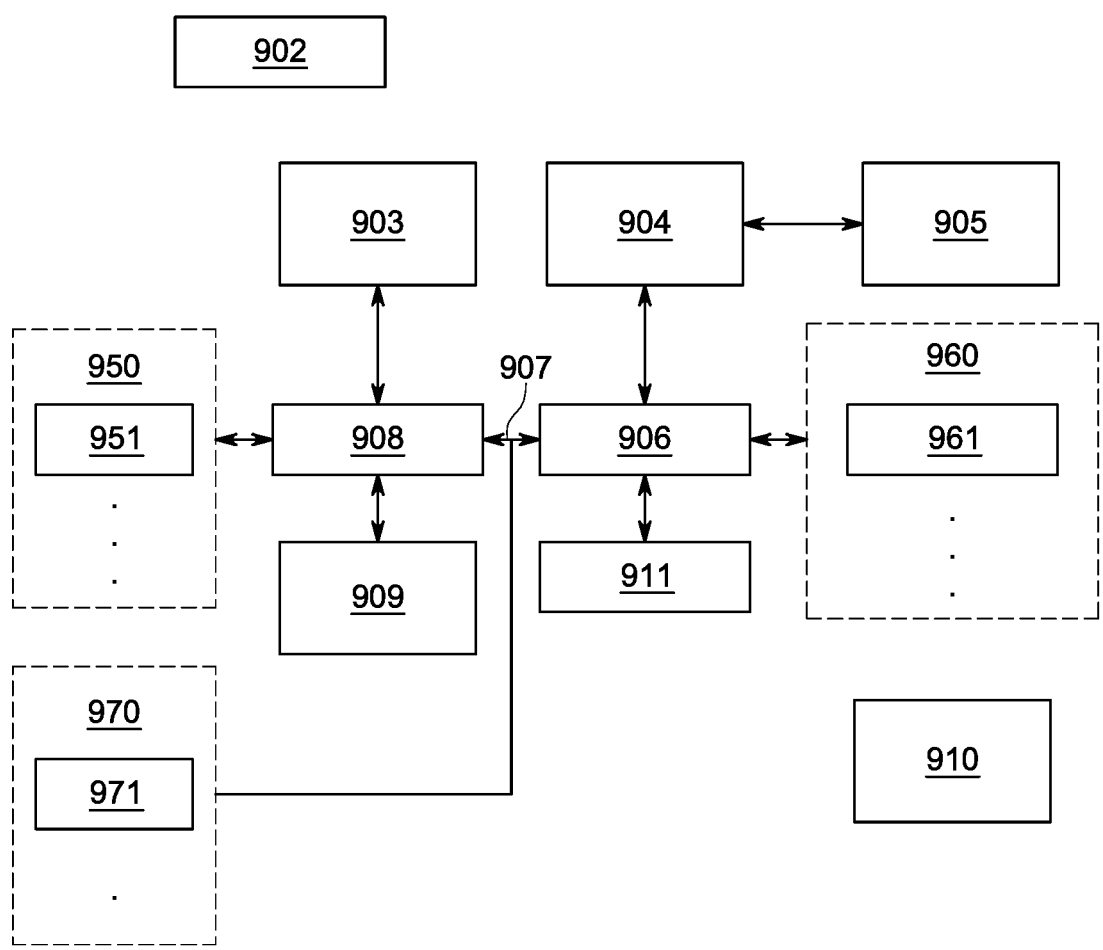
FIG. 9 is a schematic block diagram illustrating an exemplary system, in accordance with an implementation of the present disclosure.

FIG. 9 is a schematic block diagram illustrating an exemplary server system 900, in accordance with an implementation of the present disclosure. In this example, the server system 900 includes at least one microprocessor or processor 904; a BMC 903; one or more cooling modules 960; a main memory (MEM) 911; at least one power supply unit (PSU) 902 that receives an AC power from an AC power supply 901, and provides power to various components of the server system 900, such as the processor 904, north bridge (NB) logic 906, PCIe slots 960, south bridge (SB) logic 908, storage device 909, ISA slots 950, PCI slots 970, and BMC 903.

After being powered on, the server system 900 is configured to load software application from memory, a computer storage device, or an external storage device to perform various operations. The storage device 909 is structured into logical blocks that are available to an operating system and applications of the server system 900. The storage device 909 is configured to retain server data even when the server system 900 is powered off.

In FIG. 9, the memory 911 is coupled to the processor 904 via the NB logic 906. The memory 911 may include, but is not limited to, dynamic random access memory (DRAM), double data rate DRAM (DDR DRAM), static RAM (SRAM), or other types of suitable memory. The memory 911 can be configured to store firmware data of the server system 900. In some configurations, firmware data can be stored on the storage device 909.

In some implementations, the server system 900 can further comprise a flash storage device. The flash storage device can be a flash drive, a random access memory (RAM), a non-volatile random-access memory (NVRAM), or an electrically erasable programmable read-only memory (EEPROM). The flash storage device can be configured to store system configurations such as firmware data.

The processor 904 can be a central processing unit (CPU) configured to execute program instructions for specific functions. For example, during a booting process, the processor 904 can access firmware data stored in the BMC 903 or the flash storage device, and execute the BIOS 905 to initialize the server system 900. After the booting process, the processor 904 can execute an operating system in order to perform and manage specific tasks for the server system 900.

In some configurations, the processor 904 can be multi-core processors, each of which is coupled together through a CPU bus connected to the NB logic 906. In some configurations, the NB logic 906 can be integrated into the processor 904. The NB logic 906 can also be connected to a plurality of peripheral component interconnect express (PCIe) slots 960 and an SB logic 908 (optional). The plurality of PCIe slots 960 can be used for connections and buses such as PCI Express x1, USB 2.0, SMBus, SIM card, future extension for another PCIe lane, 1.5 V and 3.3 V power, and wires to diagnostics LEDs on the server system 900's chassis.

In system 900, the NB logic 906 and the SB logic 908 are connected by a peripheral component interconnect (PCI) Bus 907. The PCI Bus 907 can support functions on the processor 904 but in a standardized format that is independent of any of the processor 904's native buses. The PCI Bus 907 can be further connected to a plurality of PCI slots 970 (e.g., a PCI slot 971). Devices connect to the PCI Bus 907 may appear to a bus controller (not shown) to be connected directly to a CPU bus, assigned addresses in the processor 904's address space, and synchronized to a single bus clock. PCI cards that can be used in the plurality of PCI slots 970 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 908 can couple the PCI Bus 907 to a plurality of expansion cards or ISA slots 950 (e.g., an ISA slot 951) via an expansion bus. The expansion bus can be a bus used for communications between the SB logic 908 and peripheral devices, and may include, but is not limited to, an industry standard architecture (ISA) bus, PC/904 bus, low pin count bus, extended ISA (EISA) bus, universal serial bus (USB), integrated drive electronics (IDE) bus, or any other suitable bus that can be used for data communications for peripheral devices.

In this example, BIOS 905 can be any program instructions or firmware configured to initiate and identify various components of the server system 900. The BIOS is an important system component that is responsible for initializing and testing hardware components of a corresponding server system. The BIOS can provide an abstraction layer for the hardware components, thereby providing a consistent way for applications and operating systems to interact with a peripheral device such as a keyboard, a display, and other input/output devices.

In system 900, the SB logic 908 is further coupled to the BMC 903 that is connected to the PSU 902. In some implementations, the BMC 903 can also be a rack management controller (RMC). The BMC 903 is configured to monitor operation status of components of the server system 900, and control the server system 900 based upon the operation status of the components.

Although only certain components are shown within the exemplary systems 900 in FIG. 9, various types of electronic or computing components that are capable of processing or storing data, or receiving or transmitting signals, can also be included in the exemplary system 900. Further, the electronic or computing components in the exemplary system 900 can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 900, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, FIG. 9 is used for purposes of explanation. Therefore, a network system can be implemented with many variations, as appropriate, yet still provide a configuration of network platform in accordance with various examples of the present disclosure.

In exemplary configurations of FIG. 9, the exemplary system 900 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for characterizing an exploit, where an exploit script provided by a first computing device and configures the first computing device to attempt the exploit on a target computing device via a network, the method comprising:
   generating a plurality of samples of the exploit using the exploit script, wherein each sample comprises invariant portions and variable portions;
   removing at least one artifact from each sample in a plurality of samples, wherein an artifact comprises a portion of the sample which is non-essential to access the target computing device;

constructing a plurality of regular expressions for the plurality of samples, wherein each regular expression in the plurality of regular expressions represents a pattern for matching invariant portions of the exploit script;

testing each regular expression in the plurality of regular expressions on the plurality of samples to yield test result data; and ranking each regular expression in the plurality of regular expressions according to a ranking metric and the test result data.

2. The method of claim 1, wherein the at least one artifact includes at least one of an IP address, a date, a fixed binary string, and a fixed textual string.

3. The method of claim 1, wherein the at least one artifact is identified based on a known list of regular expressions.

4. The method of claim 1, wherein the constructing step further comprises identifying and removing inefficient regular expression features from each expression in the plurality of regular expressions.

5. The method of claim 1, wherein the test result data comprises at least one of a false positive rate, a false negative rate, an ambiguity level, and an indication of whether a selected regular expression matches a perfect factor of a number of the plurality of samples.

6. The method of claim 5, wherein the ranking step further comprises ranking regular expressions with higher false negative rates lower than regular expressions with lower false negative rates.

7. The method of claim 5, wherein the ranking step further comprises ranking regular expressions which match a perfect factor of the number of the plurality of samples higher than regular expressions which do not match a perfect factor of the number of the plurality of samples.

8. The method of claim 5, wherein the ranking step further comprises ranking regular expressions with higher false positive rates lower than regular expressions with lower false positive rates.

9. The method of claim 5, wherein the ambiguity level further comprises a probability of a match based on a selected regular expression.

10. The method of claim 5, wherein the ranking step further comprises ranking regular expressions with higher ambiguity levels lower than regular expressions with lower ambiguity levels.

11. A system for characterizing an exploit, comprising:
a first computing device;
a target computing device; and
a network, wherein the network is configured to allow communication between the first computing device and the target computing device; and
wherein the first computing device is configured to:
generate a plurality of samples of the exploit using an exploit script, wherein the exploit script is located at the first computing device and configures the first computing device to attempt unauthorized access to the target computing device via the network, and wherein each sample comprises invariant portions and variable portions;
remove at least one artifact from each sample in a plurality of samples, wherein an artifact comprises a portion of the sample which is non-essential to access the target computing device;

construct a plurality of regular expressions for the plurality of samples, wherein each regular expression in the plurality of regular expressions represents a pattern for matching invariant portions of the exploit script;

test each regular expression in the plurality of regular expressions on the plurality of samples to yield test result data; and rank each regular expression in the plurality of regular expressions according to a ranking metric and the test result data.

12. The system of claim 11, wherein the at least one artifact includes at least one of an IP address, a date, a fixed binary string, and a fixed textual string.

13. The system of claim 11, wherein the first computing device constructs the plurality of regular expressions by identifying and removing inefficient regular expression features from each expression in the plurality of regular expressions.

14. The system of claim 11, wherein the test result data comprises at least one of a false positive rate, a false negative rate, an ambiguity level, and an indication of whether a selected regular expression matches a perfect factor of a number of the plurality of samples.

15. The system of claim 14, wherein the ranking step further comprises one of: A) ranking regular expressions with higher false negative rates lower than regular expressions with lower false negative rates; b) ranking regular expressions which match a perfect factor of the number of the plurality of samples higher than regular expressions which do not match a perfect factor of the number of the plurality of samples; c) ranking regular expressions with higher false positive rates lower than regular expressions with lower false positive rates; or d) ranking regular expressions with higher ambiguity levels lower than regular expressions with lower ambiguity levels.

16. The system of claim 14, wherein the ambiguity level further comprises a probability of a match based on a selected regular expression.

17. A non-transitory machine-readable medium, having stored thereon instructions for performing a method of characterizing an exploit, the non-transitory machine-readable medium comprising machine executable code, which, when executed by at least one machine, causes the machine to:
generate a plurality of samples of the exploit using an exploit script, wherein the exploit script configures the machine to attempt unauthorized access to a target computing device and wherein each sample comprises invariant portions and variable portions;
remove at least one artifact from each sample in a plurality of samples, wherein an artifact comprises a portion of the sample which is non-essential to access the target computing device;
construct a plurality of regular expressions for the plurality of samples, wherein each regular expression in the plurality of regular expressions represents a pattern for matching invariant portions of the exploit script;
test each regular expression in the plurality of regular expressions on the plurality of samples to yield test result data; and
rank each regular expression in the plurality of regular expressions according to a ranking metric and the test result data.

* * * * *